United States Patent [19]

Nakajima et al.

[11] Patent Number: 4,816,680

[45] Date of Patent: Mar. 28, 1989

[54] RADIATION IMAGE RECORDING AND READ-OUT APPARATUS

[75] Inventors: Nobuyoshi Nakajima; Yuuma Adachi; Masamitsu Ishida, all of Kanagawa, Japan

[73] Assignee: Fuji Photo Film Co., Ltd., Kanagawa, Japan

[21] Appl. No.: 787,847

[22] Filed: Oct. 16, 1985

[30] Foreign Application Priority Data

Oct. 16, 1984 [JP]  Japan ................................ 59-216913
Oct. 19, 1984 [JP]  Japan ................................ 59-220281

[51] Int. Cl.$^4$ .............................................. G01T 1/29
[52] U.S. Cl. ............................... 250/327.2; 250/484.1
[58] Field of Search ......................... 250/484.1, 327.2; 378/165

[56] References Cited

U.S. PATENT DOCUMENTS

| 3,916,192 | 10/1975 | Schmitmann et al. ............. 378/116 |
| 4,284,889 | 8/1981 | Kato et al. ...................... 250/327.2 |
| 4,507,797 | 3/1985 | Kato .................................... 378/165 |
| 4,611,247 | 9/1986 | Ishida et al. ..................... 250/327.2 |

FOREIGN PATENT DOCUMENTS

| 0125412 | 11/1984 | European Pat. Off. ......... 250/327.2 |
| 0142709 | 5/1985 | European Pat. Off. ............ 378/172 |

Primary Examiner—Carolyn E. Fields
Assistant Examiner—Richard Hanig
Attorney, Agent, or Firm—Sughrue, Mion, Zinn, Macpeak & Seas

[57] ABSTRACT

A radiation image recording and read-out apparatus using stimulable phosphor sheets. The apparatus has a circulation path along which the stimulable phosphor sheets are conveyed. An image recording section, an image read-out section and image erasing section are provided. An imput means is provided for inputting the kind of recording and the exposure condition of the radiation, and a control means is used for determining the read-out condition based on the input information given by the input means. The apparatus optionally has an image processing section and the control means may also be used for determining the image processing condition based on the information input be the input means.

6 Claims, 4 Drawing Sheets

RADIATION IMAGE RECORDING AND READ-OUT APPARATUS

BACKGROUND OF THE INVENTION

1. Field of the Invention

This invention relates to a radiation image recording and read-out apparatus for exposing stimulable phosphor sheets to a radiation passing through object to have radiation image of the object stored therein, exposing the stimulable phosphor sheet to stimulating rays which cause them to emit light in proportion to the stored radiation energy, and detecting and converting the emitted light into electric signals. This invention particularly relates to a radiation image recording and read-out apparatus in which the stimulable phosphor sheets are circulated and reused for recording radiation images.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily stored the radiation image in order to reproduce the final visible image therefrom in a final recording medium. For economical reasons, therefore, it is desirable that the stimulable phosphor sheet be used repeatedly.

Further, with regard to a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load such a mobile X-ray diagnostic station with a number of stimulable phosphor sheets, and the amount of the stimulable phosphor sheets which can be loaded on the mobile X-ray diagnostic station is limited. Therefore, it is desired to load the mobile X-ray diagnostic station with stimulable phosphor sheets which can be used repeatedly, store the radiation images of the objects in the stimulable phosphor sheets, transfer the electric image signals read out from the stimulable phosphor sheets into a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examinations. This is very advantageous in practical use.

In order to reuse stimulable phosphor sheets as described above, the radiation energy remaining in the stimulable phosphor sheet after it is scanned with stimulating rays to read out the radiation image stored therein should be eliminated or erased by the method as described, for example, in Japanese Unexamined Patent Publication No. 56(1981)-12599 or U.S. Pat. No. 4,400,619. The stimulable phosphor sheet should then be used again for radiation image recording.

From the aforesaid viewpoint, the applicant proposed in Japanese Patent Application No. 58(1983)-66730 a built-in type radiation image recording and read-out apparatus comprising:

(i) a circulating and conveying means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein in said image recording section, and a photoelectric read-out means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, exposing said stimulable phosphor sheet to erasing light to release the radiation energy remaining in said stimulable phosphor sheet, whereby said stimulable phosphor sheet is circulated through said image recording section, said image read-out section and said erasing section and reused for radiation image recording.

Since the above-described radiation image recording and read-out apparatus is generally used for diagnosing human bodies, it is desired that the image obtained by this apparatus have high diagnostic efficiency and accuracy to perform effective diagnosis. The desirable output density or the range of the density level or contrast of the finally obtained visible image resulting from this apparatus depends upon the purpose of the diagnosis or the sort of the recorded portion of the body or the kind of disease.

Therefore, in order to obtain desirable images, it is desired to read out the image information stored in the stimulable phosphor sheet in the read-out step under the appropriate conditions particularly suitable for the purpose of diagnosis.

Further, since the above-described radiation image recording and read-out apparatus has a function to improve the diagnostic efficiency and accuracy by conducting a proper image processing on the image signal obtained by the read-out step, it is desired to make the image processing suitable for the diagnostic purpose. The image processing includes various kinds of contrast control, density level control, image gradation control, frequency processing, unsharp masking process and any other image processing steps having an effect of enhancing the diagnostic efficiency and accuracy, and also includes special technique of image processing such as image subtraction.

The above-mentioned read-out conditions and the image processing conditions suitable or desirable for the particular diagnostic purposes are determined according to the recorded portion of the object (head, chest etc.), the method of recording (simple recording or angiography or tomography etc.), purpose of diagnosis (inspection of bone shapes or condition of blood vessels etc.), which are generally called "kind of recording", and also according to "exposure conditions" of the radiation such as the tube voltage, tube current, exposure time, size of focus of the radiation source which are determined or controlled in view of the kind of recording.

As a method of determining the desirable read-out condition and the image processing condition, it is known to make a preliminary read-out of the image information stored in the stimulable phosphor sheet and determine the desirable conditions based on the radiation image information obtained thereby. The preliminary read-out is conducted by use of stimulating rays of lower energy level than that of the final read-out. This method, however, necessitates two read-out steps and takes a long time for read-out, which is not efficient in case of diagnosing a number of people where a high speed of image recording and read-out is demanded. Further, since the stimulating rays are used for the preliminary read-out, the life of the stimulating ray source is shortened. Furthermore, by the increase of the number of scanning, the life of the stimulable phosphor sheet is shortened, too.

SUMMARY OF THE INVENTION

The primary object of the present invention is to provide a built-in type radiation image recording and read-out apparatus which makes it unnecessary to conduct the preliminary read-out for determining the read-out condition and/or image processing condition and enables to determine the desirable read-out and/or image processing conditions by a simple operation.

Another specific object of the present invention is to provide a built-in type radiation image recording and read-out apparatus in which the read-out condition is determined by a simple operation only based on the kind of recording and exposure conditions.

In a first aspect, the present invention provides a radiation image recording and read-out apparatus provided with (i) a circulating and conveying means for conveying stimulable phosphor sheets for recording a radiation image therein along a predetermined circulation path, (ii) an image recording section positioned on said circulation path for recording a radiation image of an object in each of said stimulable phosphor sheets by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, (iv) an erasing section positioned on said circulation path for, prior to the next image recording in said stimulable phosphor sheet for which the image read-out has been conducted at said image read-out section, exposing said stimulable phosphor sheet to erasing light to release the radiation energy remaining in said stimulable phosphor sheet, (v) an input means for inputing the kind of recording and the exposure conditions of said radiation, and (vi) a control means for determining the read-out condition based on the input information given by said input means and controlling the operation of said image read-out section according to the determined read-out condition.

In another aspect of the invention, the radiation image recording and read-out apparatus further comprises an image processing section which performs image processing on the image signal obtained by said photoelectric read-out means of the image read-out section, and said control means further determines the image processing condition and the image processing section operates based on the image processing condition determined thereby.

DESCRIPTION OF THE PREFERRED EMBODIMENTS

The present invention will hereinbelow be described in further detail with reference to the accompanying drawings.

Figure 1:
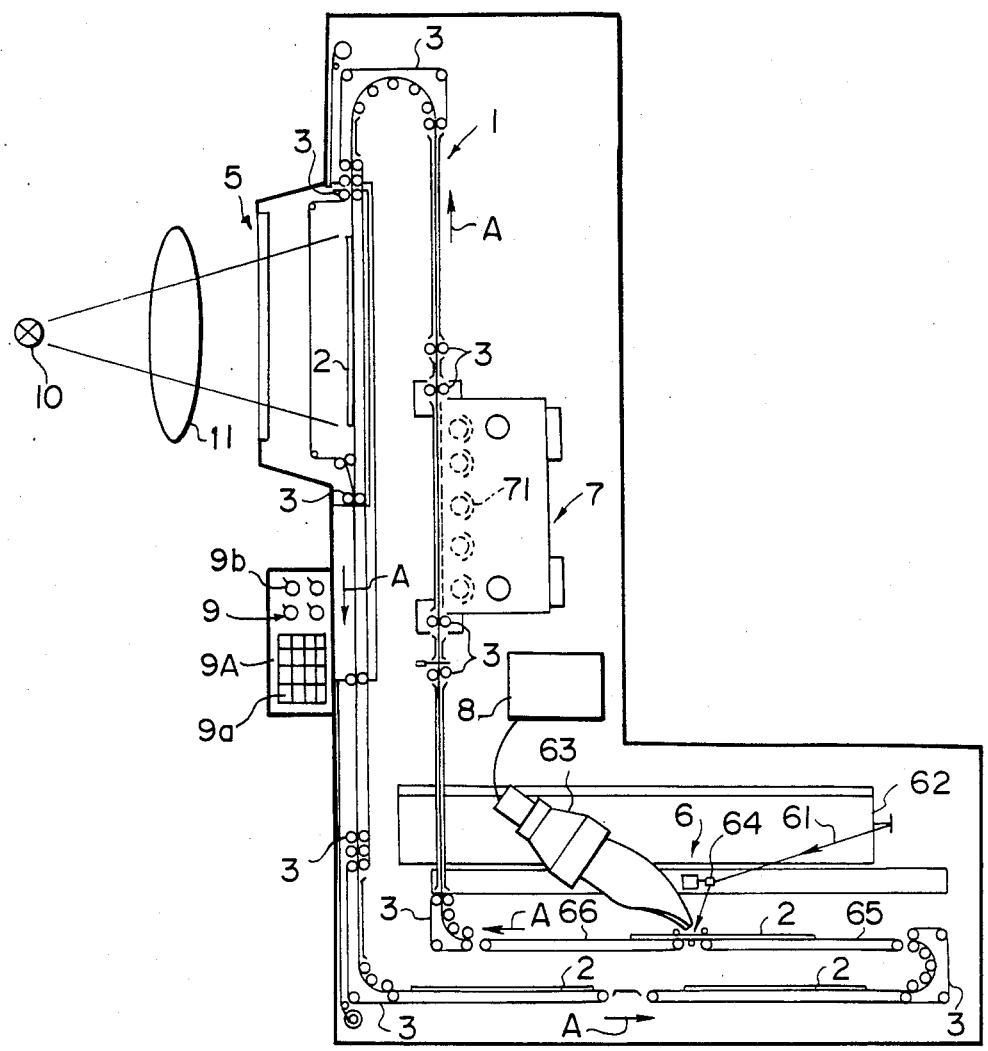
FIG. 1 is a schematic side view showing an embodiment of the radiation image recording and read-out apparatus in accordance with the present invention.

Referring to FIG. 1, the radiation image recording and read-out apparatus is provided with an L-shaped circulation path, and stimulable phosphor sheets 2 are conveyed and circulated by a circulation and conveyance means 3 comprising conveyor rollers, conveyor belts and the like along the circulation path 1.

An image recording section 5, an image read-out section 6 and an erasing section 7 are positioned in the sheet advancing direction as indicated by the arrow A on the circulation path 1.

At the image recording section 5, the stimulable phosphor sheet 2 is exposed to a radiation emitted by a radiation source 10 and passing through an object 11 to have a radiation image of the object 11 stored in the sheet 2. In this embodiment, the position of the image recording section 5 is adjustable vertically.

The exposed sheet 2 is conveyed by the circulation and conveyance means 3 in the direction as indicated by the arrow A along the circulation path 1 into the image read-out section 6.

The image read-out section 6 comprises a stimulating ray source 62 for emitting stimulating rays 61, e.g. a laser beam, for scanning the sheet 2, and a photoelectric read-out means 63, e.g. a photomultiplier, for detecting light emitted by the sheet 2 upon exposure to the stimulating rays 61 and converting it into an electric image signal. Reference numeral 64 denotes a galvanometer mirror. Since image readout is conducted by moving the sheet 2 at a predetermined speed, the image read-out section 6 is provided with a space 65 for one sheet where the sheet 2 just prior to the image read-out is positioned and a space 66 for one sheet where the sheet 2 just after the image read-out is positioned After the read-out step, the sheet 2 is sent by the circulation and conveyance means 3 to the erasing section 7.

The erasing section 7 is provided with many erasing light sources 71 constituted by fluorescent lamps or the like. The sheet 2 is exposed to erasing light emitted by the erasing light sources 71 to release the radiation energy remaining in the sheet 2.

The erased sheet 2 is then sent by the circulation and conveyance means 3 to the image recording section 5.

Figure 2:
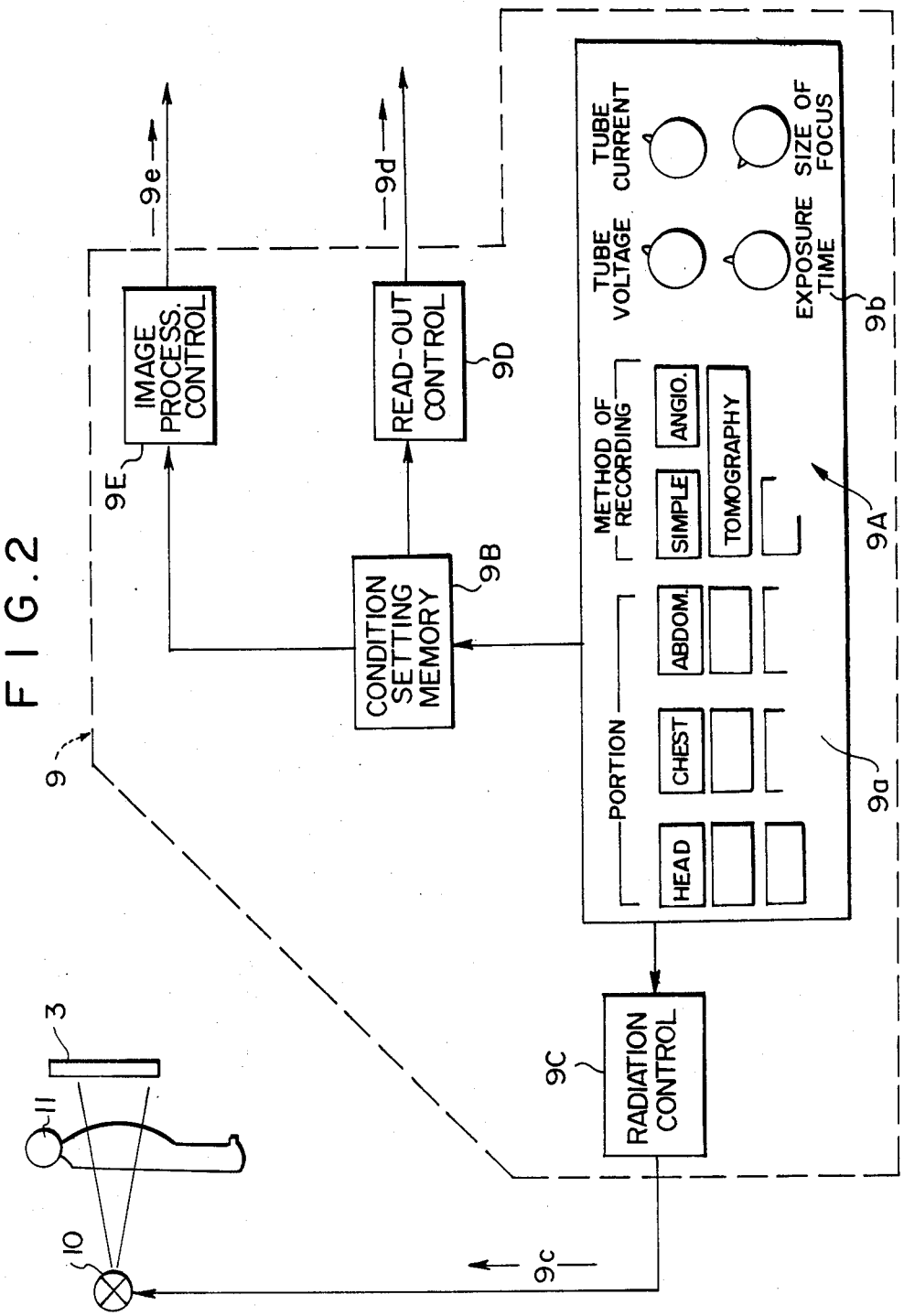
FIG. 2 is a block diagram showing the function of the control means in the embodiment as shown in FIG. 1.

A condition setting section 9 is provided at a position operable from outside of the apparatus. The condition setting section 9 is provided on an input board 9A with a key board 9a (FIG. 2) for inputing information regarding the kind of recording such as the recorded portion of the object (head, chest etc.), the method of recording (simple recording, angiography, tomography etc.), purpose of diagnosis (inspection of bone shapes, condition of blood vessels etc.) and a control dial 9b for inputing information regarding exposure condition such as the tube voltage, tube current, exposure time, size of focus of the radiation source which are determined and controlled in view of the kind of recording. The condition setting section 9 is further provided with a radiation controller 9c for directly controlling the radiation source 10 based on the information regarding the exposure condition and condition setting means 9B,9D,9E for setting the read-out condition of said image read-out section 6 and/or the image processing condition of said image processing section 8 based of the kind of recording and/or exposure condition input by said input means 9a and/or 9b. The condition setting means comprises a condition setting memory 9B, a read-out controller 9D and an image processing controller 9E. The function of the condition setting section 9 will be described with reference to the block diagram in FIG. 2.

By selection on the key board 9a and control on the control dial 9b provided on the input key board 9A, the information as to the kind of recording and the exposure condition is input into the condition setting section 9. The information regarding the exposure condition is first sent directly to a radiation controller 9C which in turn generates a radiation exposure condition setting signal 9c based on the received information, which in turn is sent to the radiation source 10. According to the signal 9c, the radiation source 10 emits a radiation under the exposure condition input therein.

On the other hand, the information regarding the kind of recording and the exposure condition is sent to a condition setting memory 9B which memorises read-out condition and image processing condition for every kind of recording and exposure condition. The condition setting memory 9B outputs an image processing condition setting signal 9e through the image processing controller 9E and a read-out condition setting signal 9d through the read-out controller 9D, respectively. Thus, the proper image processing condition and/or read-out condition based on the input information is set at the image processing section 8 and/or the image read-out section 6.

Figure 3:
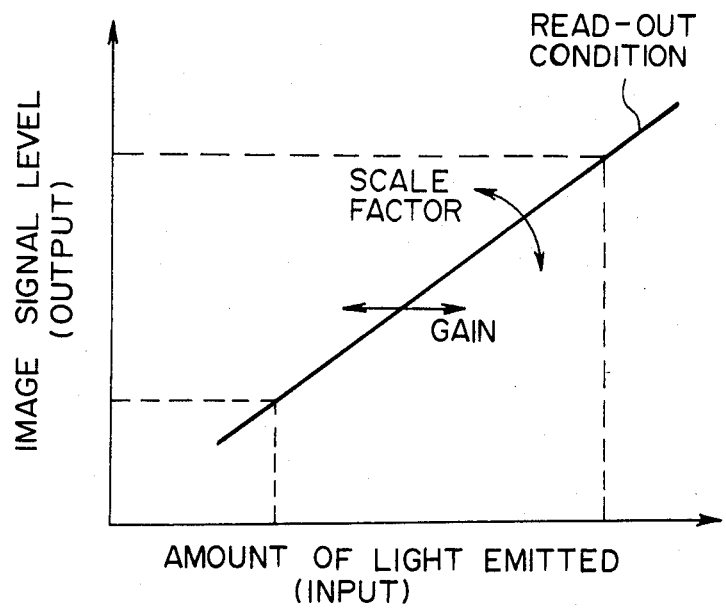
FIG. 3 is a graph which shows an example of the read-out condition.

It sould be noted that, when the read-out condition is determined, it is not necessary to determine all the read-out conditions based on the input information regarding the kind of recording and the exposure condition, but only several important read-out information may be determined. Read-out gain and a scale factor are examples of such read-out conditions. The read-out gain is a parameter which represents the position of the line shown in FIG. 3 that indicates the read-out condition and determines the level of the output signal ( image signal ) for some level of the input signal ( e.g. a certain amount of light emitted from the stimulable phosphor sheet upon exposure thereof to stimulating rays ). The scale factor is a parameter which represents the inclination or gradient of the line shown in FIG. 3 that indicates the read-out condition and determines the relation between the range of the level of the input signal input into the read-out means and the range of the level of the output signal.

In the above-described embodiment, the information regarding the kind of recording and the information regarding the exposure condition are independently input. However, it may be understood that the exposure condition can be automatically determined according to the kind of recording, and accordingly only the information regarding the kind of recording may be input determining the information regarding the exposure condition automatically based thereon. Specifically, an exposure condition setting memory which memorizes the exposure condition for every kind of recording is provided in the controlling section and the image processing condition and the read-out condition are set based on the signal generated therefrom.

Further, the condition setting section 9 may not always be provided in the apparatus but may be provided in an operating room and only the condition setting signal may be transmitted to the body of the apparatus and the radiation source.

Figure 4:
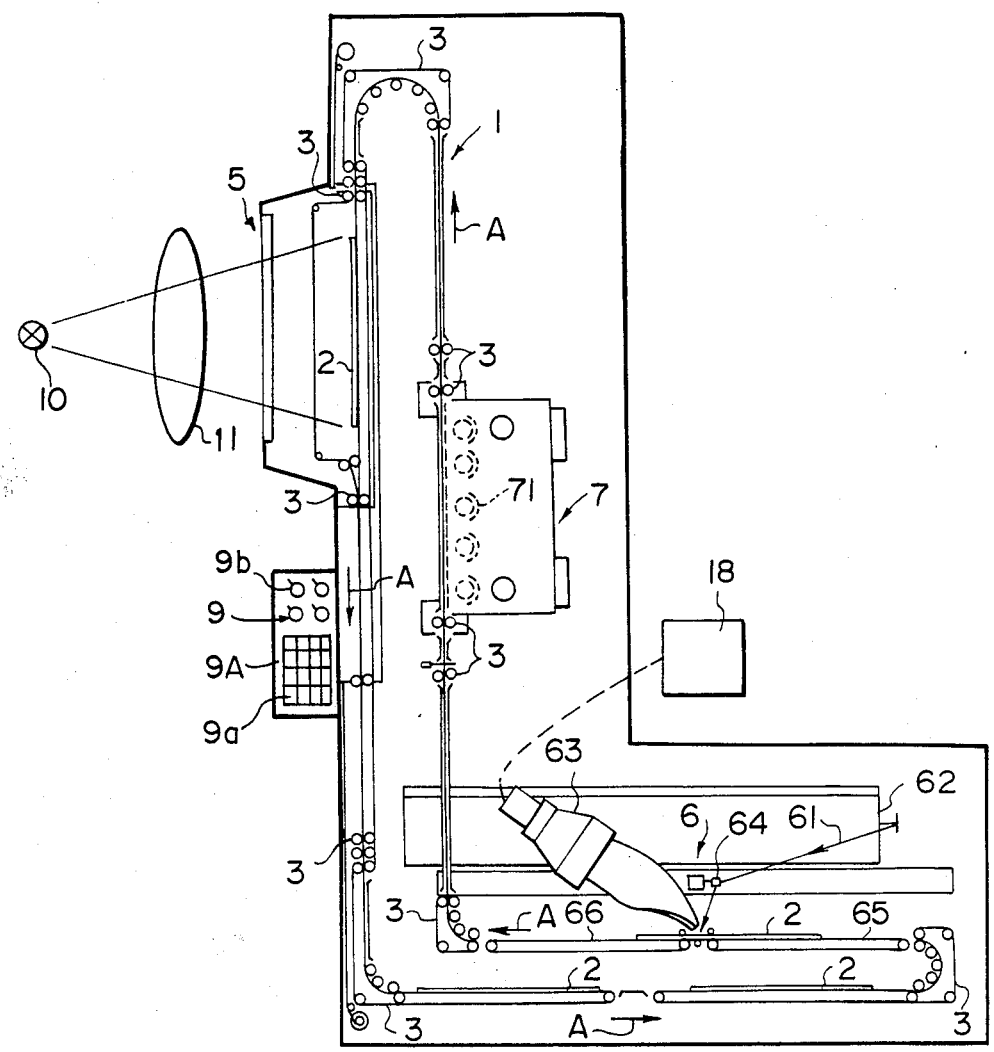
FIG. 4 is a schematic side view showing another embodiment of the radiation image recording and read-out apparatus in accordance with the present invention.

Another embodiment of the present invention will now be described with reference to FIG. 4. The apparatus shown in FIG. 4 is quite equivalent to that shown in FIG. 1 in that the stimulable phosphor sheets 2 are circulated through a circulation path by a circulating and conveying means by way of a recording station 5, an image read-out section 6, and an erasing section 7 to repeatedly record and read-out radiation images thereon. Therefore, the description of the equivalent elements is omitted here by designating them with the same reference numerals.

The photoelectric read-out means 63 of the image read-out section 6 is connected to an image processing section (image processor) 18 provided outside of the apparatus. The apparatus is further provided with a condition setting section 9 for determining the read-out condition at the image read-out section 6 and/or the image processing condition at the image processing section 18 based on the input information regarding the kind of recording and the exposure condition of the radiation. The condition setting section 9 is located at a position on the apparatus where it is operable from outside the apparatus. The details of the condition setting section 9 is quite the same as that of the first embodiment as shown in FIG. 1, and accordingly the detailed description thereof is omitted here. It will readily be understood that the condition setting section 9 can be provided at a separate position and connected with the apparatus similarly to the modification of the first embodiment mentioned hereinbefore.

In accordance with the present invention, the read-out condition and/or the image processing condition are determined by simply selecting the kind of recording among a number of kinds of recording. Therefore, there is no need to conduct the preliminary read-out and the time required for recording and read-out is shortened and accordingly it is suitable for conducting diagnosis of a number of people. Furthermore, the consumption of the stimulating rays is lowered and the amount of the stimulating rays to which the stimulable phosphor sheets are subjected to per one turn of circulation is lowered, which results in elongation of the life of the stimulating ray source and thestimulable phosphor sheets.

We claim:

1. A radiation image recording and read-out apparatus comprising:
   (i) a circulating and conveying means for conveying at least one stimulable phosphor sheet for recording a radiation image thereon along a predetermined circular path,
   (ii) an image recording section positioned on said circulation path for recording a radiation transmission image of an object on said stimulable phosphor sheet to radiation passing through said object,
   (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal,
   (iv) an erasing section positioned on said circulation path for, prior to the next image recording in said stimulable phosphor sheet for which the image read-out has been conducted at said image read-out section, exposing said stimulable phosphor sheet to erasing light to release the radiation energy remaining in said stimulable phosphor sheet,
   (v) condition setting means, including means for inputting first information indicative of the kind of recording desired, and means for specifying second information indicative of exposure conditions of said radiation, said first information including information regarding the object to be recorded, recording method, and diagnostic purpose, said second information including voltage and current of a tube used in said image recording section, exposure time, and size of focus of a radiation source in said image recording section, said image recording section being controlled accordingly; and
   (vi) a control means for determining read-out conditions based on said first and second information and for controlling the operation of said image read-out section according to the determined read-out conditions.

2. A radiation image recording and read-out apparatus as defined in claim 1 wherein said condition setting means is provided on the apparatus at a position where the condition setting means can be operated from outside the apparatus.

3. A radiation image recording and read-out apparatus as defined in claim 1 further comprising an image processing section which performs image processing on the image signal obtained by said photoelectric read-out means of the image read-out section, said control means determining at least one of the read-out condition and the image processing condition.

4. A radiation image recording and read-out apparatus as defined in claim 3 wherein said image processing section is located in the apparatus.

5. A radiation image recording and read-out apparatus as defined in claim 3 wherein said image processing section is located outside the apparatus and connected to the photoelectric read-out means of the image read-out section of the apparatus.

6. A radiation image recording and read-out apparatus as defined in claim 1, further comprising an image processing section which performs image processing on the image signal obtained by said photoelectric read-out means of the image read-out section, wherein said control means determines both the read-out condition and the image processing condition.

* * * * *